(12) United States Patent
Liu et al.

(10) Patent No.: US 11,491,603 B2
(45) Date of Patent: Nov. 8, 2022

(54) MACHINED WHEEL POST-PROCESSING EQUIPMENT

(71) Applicant: CITIC Dicastal CO., LTD., Hebei (CN)

(72) Inventors: Huiying Liu, Qinhuangdao (CN); Chong Li, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 690 days.

(21) Appl. No.: 16/508,300

(22) Filed: Jul. 11, 2019

(65) Prior Publication Data

US 2020/0147745 A1 May 14, 2020

(30) Foreign Application Priority Data

Nov. 12, 2018 (CN) .......................... 201811338166.9

(51) Int. Cl.
| | | |
|---|---|---|
| B24B 9/04 | (2006.01) | |
| B24B 27/00 | (2006.01) | |
| B24B 41/00 | (2006.01) | |
| B24B 41/02 | (2006.01) | |
| B24B 41/06 | (2012.01) | |
| B24D 13/10 | (2006.01) | |

(52) U.S. Cl.
CPC ............ *B24B 9/04* (2013.01); *B24B 27/0076* (2013.01); *B24B 41/005* (2013.01); *B24B 41/02* (2013.01); *B24B 41/06* (2013.01); *B24D 13/10* (2013.01)

(58) Field of Classification Search
CPC ..... B24B 5/44; B24B 29/005; B24B 27/0023; B24B 27/0076; B24B 41/005; B24B 41/06; B24B 41/02; B24B 9/04; B24D 13/10; B23Q 1/0081; B23Q 1/0018
USPC .......................................................... 451/231
See application file for complete search history.

(56) References Cited

U.S. PATENT DOCUMENTS

| | | | | |
|---|---|---|---|---|
| 9,782,866 | B1 * | 10/2017 | Xue | ..................... B24B 27/0069 |
| 2018/0264617 | A1 * | 9/2018 | Xue | ....................... B24B 29/04 |
| 2018/0333783 | A1 * | 11/2018 | Zheng | ................... B23B 39/161 |
| 2018/0361527 | A1 | 12/2018 | Liu et al. | |
| 2019/0030631 | A1 | 1/2019 | Liu et al. | |

FOREIGN PATENT DOCUMENTS

| | | |
|---|---|---|
| CN | 107283000 A | 10/2017 |
| CN | 107363669 A | 11/2017 |
| CN | 106826455 B | 8/2018 |

OTHER PUBLICATIONS

European Search Report in the European application No. 19205974.9, dated Jan. 31, 2020.

* cited by examiner

*Primary Examiner* — Anne M Kozak
*Assistant Examiner* — Bobby Lee Budziszek
(74) *Attorney, Agent, or Firm* — Syncoda LLC; Feng Ma

(57) ABSTRACT

A machined wheel post-processing equipment includes a wheel inlet roller way, a lower machine frame, lower guide posts, lower air cylinders, a supporting plate, guide sleeves, a lifting table, guide rails, a clamping cylinder, a left sliding plate, a right sliding plate, a rack and pinion, servomotors, a lifting roller way, clamping wheels, a first servomotor, and a overturning platform.

1 Claim, 6 Drawing Sheets

MACHINED WHEEL POST-PROCESSING EQUIPMENT

CROSS-REFERENCE TO RELATED APPLICATION

The present application claims benefit of Chinese Patent Application No. 201811338166.9, filed on Nov. 12, 2018, the contents of which are hereby incorporated by reference in their entirety.

BACKGROUND

Aluminum-alloy wheels need post-processing procedures such as deburring, burr brushing and automatic detection after machining; at present, in actual production, equipment is relatively single, and integrated equipment for post-processing after machining is in shortage; based on this present situation, the present patent provides machined wheel post-processing equipment, post-processing procedures after machining are integrated, so that requirements for deburring and burr brushing after the wheel is machined are met, the efficiency of post-processing processes is increased greatly, the on-line orientation changing of the wheel is achieved, and preparations are made for automatic detection on the wheel; and the equipment has a very high application value in the actual production.

SUMMARY

The present disclosure relates to the technical field of machined wheel post-processing and particularly relates to a device for deburring, burr brushing and orientation changing of machined wheels.

An object of the present disclosure is to provide machined wheel post-processing equipment. Requirements for deburring and burr brushing after the wheel is machined can be met, the efficiency of post-processing processes can be increased greatly, the on-line orientation changing of the wheel is achieved, and preparations are made for automatic detection on the wheel.

In order to achieve the object described above, a technical solution of the present disclosure is as follows: a machined wheel post-processing equipment is composed of a wheel inlet roller way, a lower machine frame, lower guide posts, lower air cylinders, a supporting plate, guide sleeves, a lifting table, guide rails, a clamping cylinder, a left sliding plate, a right sliding plate, a rack and pinion, servomotors, a lifting roller way, clamping wheels, a first servomotor, an overturning platform, first air cylinders, first guide posts, first platforms, supporting tables, first guide rails, regulating cylinders, first sliders, riser deburr knives, second air cylinders, second guide rails, second sliders, wheel rim deburr knives, tool-connecting-edge deburr knives, an upper machine frame, cross guide rails, a left air cylinder, a left slider, an third air cylinder, a second platform, second guide posts, a second servomotor, a shaft, a rotating rack, a third servomotor, an inner support, roller shaft brackets, a driving bevel gear, a left driven bevel gear, a right driven bevel gear, a left hair brush, a right hair brush, an air compressor, an air outlet hood, a right air cylinder, a right slider, an fourth air cylinder, third guide posts, a third platform, a sleeve, an inner air cylinder, a draw bar, an expansion core, an expansion sleeve and a wheel outlet roller way.

The machined wheel post-processing equipment is composed of five systems. A first system is a wheel front side deburring system which is used for completing the locating, clamping, lifting, rotating and front side deburring of the wheel; a second system is a wheel on-line orientation changing system which is used for changing the wheel into the state that the back cavity faces upwards from the state that the front side of the wheel faces upwards; a third system is a spoke back-cavity burr brushing system which is used for completing burr brushing of the back cavity of the wheel; a fourth system is a cleaning system, wherein a center hole and a back cavity of a hub are blown clean through compressed air, and thus, the accuracy of subsequent automatic detection is guaranteed; and a fifth system is a discharging system which is used for transferring the wheel downwards to the wheel outlet roller way from a worktable. Through close cooperation of the five systems, the beat is short, the efficiency is high, requirements for deburring and burr brushing processes after the wheel is machined can be met, the on-line orientation changing of the wheel can be achieved, and preparations are made for automatic detection on the wheel.

The lower air cylinders are fixed onto the supporting plate, the output ends of the lower air cylinders are connected with the lifting table, and the lower air cylinders control the lifting table to move up and down under the guiding action of the lower guide posts. The guide rails are symmetrically mounted on the lifting table, the left sliding plate and the right sliding plate are mounted on the guide rails and are connected by the rack and pinion, and the output end of the clamping cylinder is connected with the left sliding plate. Four servomotors are symmetrically mounted on the left sliding plate and the right sliding plate, the clamping wheels are mounted at the output ends of the motors, the lifting roller way is fixed onto the lifting table, and the lifting roller way and the wheel inlet roller way are consistent in height. The wheel enters the lifting roller way from the wheel inlet roller way, then, the clamping cylinder is started up, the wheel can be located and clamped by the four clamping wheels under the action of the rack and pinion, then, the servomotors are started up to drive the clamping wheels to rotate, the wheel can be driven to rotate at a low speed, then, the lower air cylinders are started up to drive the lifting table to rise, and thus, the rotating wheel is lifted to a proper height. The supporting tables are arranged right above the rotating wheel, four second air cylinders are uniformly distributed at circumferential direction of each supporting table, the output ends of the second air cylinders are connected with four second sliders, horizontal movement of the second sliders is controlled by the second air cylinders under the guiding action of the second guide rails, and four wheel rim deburr knives are uniformly distributed on the four second sliders. The first air cylinders are mounted at centers of the supporting tables, the first platforms are controlled to move up and down under the guiding action of the first guide posts, the regulating cylinders are fixed onto the first platforms, the output ends of the regulating cylinders are connected with the first sliders, horizontal movement of the first sliders is controlled by the regulating cylinders under the guiding action of the first guide rails, the riser deburr knives and the tool-connecting-edge deburr knives are mounted on the first sliders in a back-to-back manner, vertical and horizontal positions of the riser deburr knives and the tool-connecting-edge deburr knives can be regulated by the first air cylinders and the regulating cylinders, and thus, the deburr knives can be in contact with to-be-deburred parts. After the rotating wheel is lifted to the proper height, the four second air cylinders are started up simultaneously to drive the four wheel rim deburr knives to simultaneously gather towards the center of the wheel, and burrs of an outer rim can be removed when the wheel rim deburr knives are in contact with the rotating wheel. During wheel rim deburring, positions of the riser deburr knives are adjusted firstly by the first air cylinders and the regulating cylinders, then, the knives can be in contact with the rotating wheel, and thus, riser burrs are removed; and then, positions of the knife-receiving-rib deburr knives are adjusted, then, the knives can be in contact with the rotating wheel, and thus, tool-connecting-edge burrs are removed. This is the wheel front side deburring system which is used for completing the locating, clamping, lifting, rotating and front side deburring of the wheel.

The first servomotor is fixed at the side of the lower machine frame, the output end of the first servomotor is connected with the overturning platform, the supporting tables are symmetrically distributed on the upper and lower surfaces of the overturning platform, and the deburr knives are arranged on the supporting tables. After the front side deburring of the wheel is completed, the riser deburr knives and the tool-connecting-edge deburr knives are retracted and restored to the original position, the four wheel rim deburr knives are kept immobile, the outer rim of the wheel is clamped by using spoon-shaped structures, the clamping wheels are loosened, the lifting table falls back and is restored to the original position, and at this time, switching from the roller way to in-the-air clamping of the wheel is completed; and then, the first servomotor is started up to drive the overturning platform to turn over by 180 degrees, the wheel-loaded supporting table is switched to an upward side, the wheel is changed into the state that the back cavity faces upwards from the state that the front side faces upwards, and the unloaded supporting table is switched to a downward side and gets ready for front side deburring and clamping of a next wheel. This is the wheel on-line orientation changing system.

The two cross guide rails are mounted on the upper machine frame, the left air cylinder is mounted at the left side of the upper machine frame, the output end of the left air cylinder is connected with the left slider, and the left slider is mounted on the cross guide rails. The third air cylinder is fixed at the lower part of the left slider, and up-and-down movement of the second platform is controlled by the third air cylinder under the guiding action of the second guide posts. The second servomotor is fixed onto the second platform, the rotating rack is mounted at the output end of the second servomotor, the roller shaft brackets are symmetrically mounted at the left and right ends of the rotating rack, the inner support is mounted in the middle of the rotating rack, the third servomotor is mounted on the inner support, the output end of the third servomotor is connected with the driving bevel gear, the left driven bevel gear is mounted on a left-side roller shaft and is matched with the driving bevel gear, a right driven bevel gear is mounted on a right-side roller shaft and is matched with the driving bevel gear, the left hair brush is mounted on the left-side roller shaft, and the right hair brush is mounted on the right-side roller shaft. When the front side deburred wheel is switched into the state that the back cavity faces upwards, the left air cylinder is started up to drive the hair brushes to be located right above the back cavity of the wheel, then, the third air cylinder is started up to drive the hair brushes to descend in place, then, the second servomotor is started up to drive the rotating rack to rotate, and thus, the hair brushes are driven to rotate in the circumferential direction; and at the same time, the third servomotor is started up to drive the driving bevel gear to rotate, thus, the left hair brush and the right hair brush are driven to rotate, and multi-orientation and multi-angle burr brushing can be achieved through circumferential rotation and rotation of the hair brushes. This is the spoke back-cavity burr brushing system which is used for completing burr brushing of the back cavity of the wheel.

The air compressor is mounted at the dead center of the upper machine frame, and the air outlet hood is mounted at the output end of the compressor and is located between the two cross guide rails. After burr brushing of the back cavity of the wheel is completed, the hair brushes are retracted and restored to the original position, then, the air compressor is started up, compressed air is blown to the back cavity of the wheel through the air outlet hood, remaining and brushed-off aluminum chip burrs are cleaned up through the compressed air, and thus, this is the cleaning system; and the center hole and the back cavity of the hub are blown clean, and thus, the accuracy of subsequent automatic detection on center hole diameter, position degree, etc. is guaranteed.

The right air cylinder is mounted at the right side of the upper machine frame, the output end of the right air cylinder is connected with the right slider, the right slider is mounted on the cross guide rails, the fourth air cylinder is fixed at the lower part of the right slider, the fourth air cylinder drives the third platform to move up and down under the guiding action of the third guide posts, the sleeve is fixed onto the third platform, the inner air cylinder is mounted inside the sleeve, the draw bar is mounted at the output end of the inner air cylinder and is connected with the expansion core, and the expansion core cooperates with the expansion sleeve. After the back cavity of the wheel is cleaned up, the right air cylinder is started up to drive the expansion sleeve to be located right above the wheel, then, the fourth air cylinder is started up to drive the expansion sleeve to descend into the center hole of the wheel, then, the inner air cylinder is started up to draw the expansion core, and the wheel is expanded by the expansion sleeve. Then, the wheel is loosened by the wheel rim deburr knives, the fourth air cylinder drives the third platform to ascend, the wheel is lifted, then, the right air cylinder is retracted and restored to the original position, the wheel is transferred to a position above the wheel outlet roller way, finally, the fourth air cylinder drives the third platform to descend, the expansion sleeve is loosened, and the wheel is placed on the wheel outlet roller way for downward transferring. This is the discharging system.

A working process of the machined wheel post-processing equipment is as follows: a wheel enters the lifting roller way from the wheel inlet roller way, then, the clamping cylinder is started up, the wheel can be located and clamped by the four clamping wheels under the action of the rack and pinion, then, the servomotors are started up to drive the clamping wheels to rotate, the wheel can be driven to rotate at a low speed, then, the lower air cylinders are started up to drive the lifting table to rise, and thus, the rotating wheel is lifted to a proper height. The four second air cylinders are started up simultaneously to drive the four wheel rim deburr knives to simultaneously gather towards the center of the wheel, and burrs of an outer rim can be removed when the wheel rim deburr knives are in contact with the rotating wheel. During wheel rim deburring, positions of the riser deburr knives are adjusted firstly by the first air cylinders and the regulating cylinders, then, the knives can be in contact with the rotating wheel, and thus, riser burrs are removed; and then, positions of the tool-connecting-edge deburr knives are adjusted, then, the knives can be in contact with the rotating wheel, and thus, tool-connecting-edge burrs are removed. After the front side deburring of the wheel is completed, the riser deburr knives and the knifereceiving-rib deburr knives are retreated and restored to the original position, the four wheel rim deburr knives are kept immobile, the outer rim of the wheel is clamped by using spoon-shaped structures, the clamping wheels are loosened, the lifting table falls back and is restored to the original position, and then, switching from the roller way to in-the-air clamping of the wheel is completed; and then, the first servomotor is started up to drive the overturning platform to turn over by 180 degrees, the wheel-loaded supporting table is switched to an upward side, the wheel is changed into the state that the back cavity faces upwards from the state that the front side faces upwards, and the unloaded supporting table is switched to a downward side and gets ready for front side deburring and clamping of a next wheel. When the front side deburred wheel is switched into the state that back cavity faces upwards, the left air cylinder is started up to drive the hair brushes to be located right above the back cavity of the wheel, then, the third air cylinder is started up to drive the hair brushes to descend in place, then, the second servomotor is started up to drive the rotating rack to rotate, and thus, the hair brushes are driven to rotate in the circumferential direction; and at the same time, the third servomotor is started up to drive the driving bevel gear to rotate, thus, the left hair brush and the right hair brush are driven to rotate, and multi-orientation and multi-angle burr brushing can be achieved through circumferential rotation and rotation of the hair brushes. After burr brushing of the back cavity of the wheel is completed, the hair brushes are retreated and restored to the original position, then, the air compressor is started up, compressed air is blown to the back cavity of the wheel through the air outlet hood, remaining and brushed-off aluminum chip burrs are cleaned up through the compressed air, after the back cavity of the wheel is cleaned up, the right air cylinder is started up to drive the expansion sleeve to be located right above the wheel, then, the fourth air cylinder is started up to drive the expansion sleeve to descend into the center hole of the wheel, then, the inner air cylinder is started up to draw the expansion core, and the wheel is expanded by the expansion sleeve. Then, the wheel is loosened by the wheel rim deburr knives, the fourth air cylinder drives the third platform to ascend, the wheel is lifted, then, the right air cylinder is retreated and restored to the original position, the wheel is transferred to a position above the wheel outlet roller way, finally, the fourth air cylinder drives the third platform to descend, the expansion sleeve is loosened, and the wheel is placed on the wheel outlet roller way for downwards transferring. A second wheel is subjected to feeding, clamping and front side deburring while the first wheel is subjected to burr brushing, back cavity cleaning and downwards transferring; and after the burr-brushed wheel is downwards transferred, upper and lower stations are switched, and this cycle is repeated. Beats are integrated and compressed, and the upper and lower stations perform actions simultaneously, so that the working efficiency is increased greatly.

According to the machined wheel post-processing equipment, requirements for deburring and burr brushing after the wheel is machined can be met, the efficiency of post-processing processes can be increased greatly, the on-line orientation changing of the wheel is achieved, and preparations are made for automatic detection on the wheel.

DETAILED DESCRIPTION

The details and working conditions of a specific device provided by the present disclosure are described below with reference to drawings.

Figure 1:
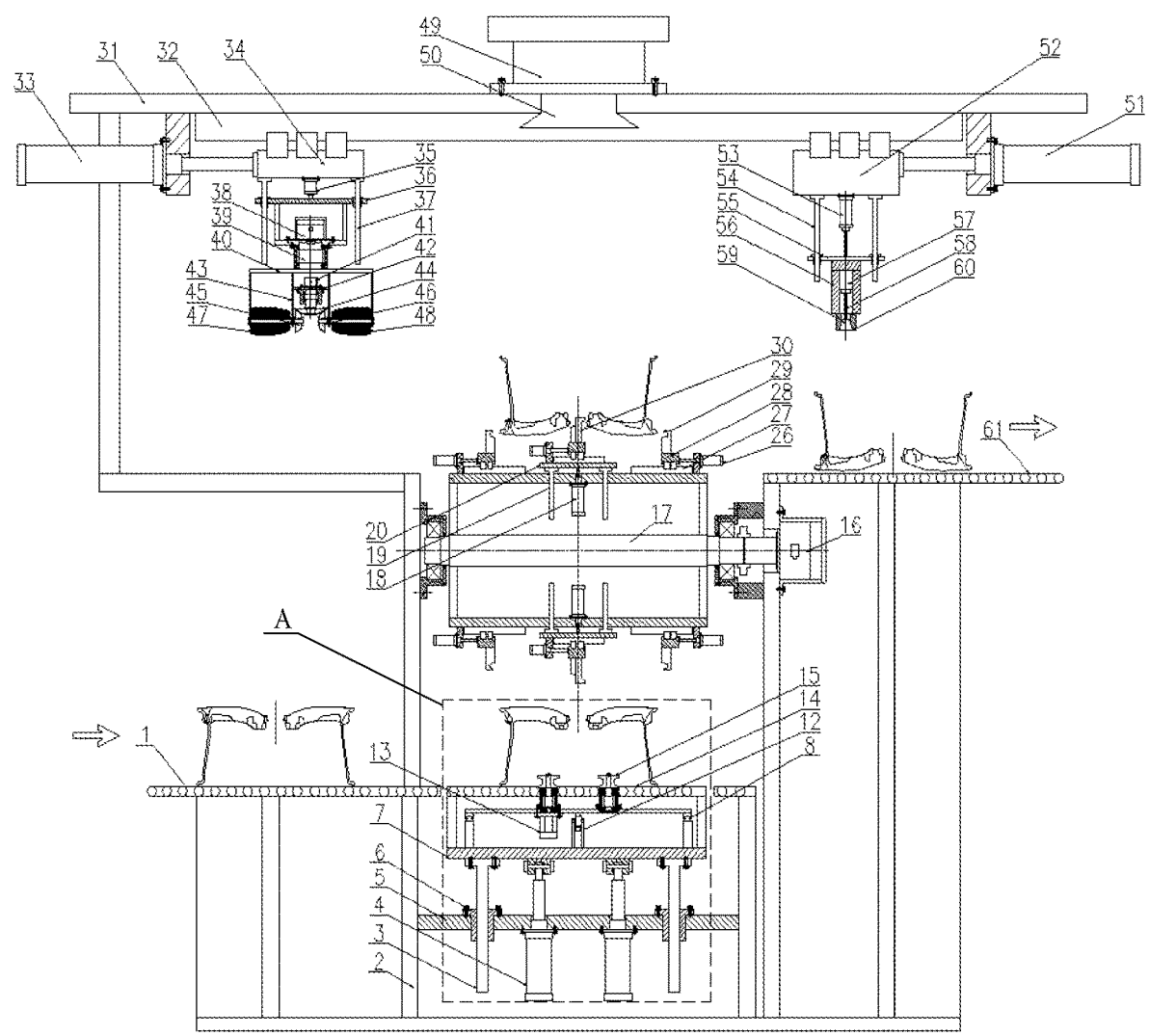
FIG. 1 is a front view of machined wheel post-processing equipment of the present disclosure.
Figure 2:
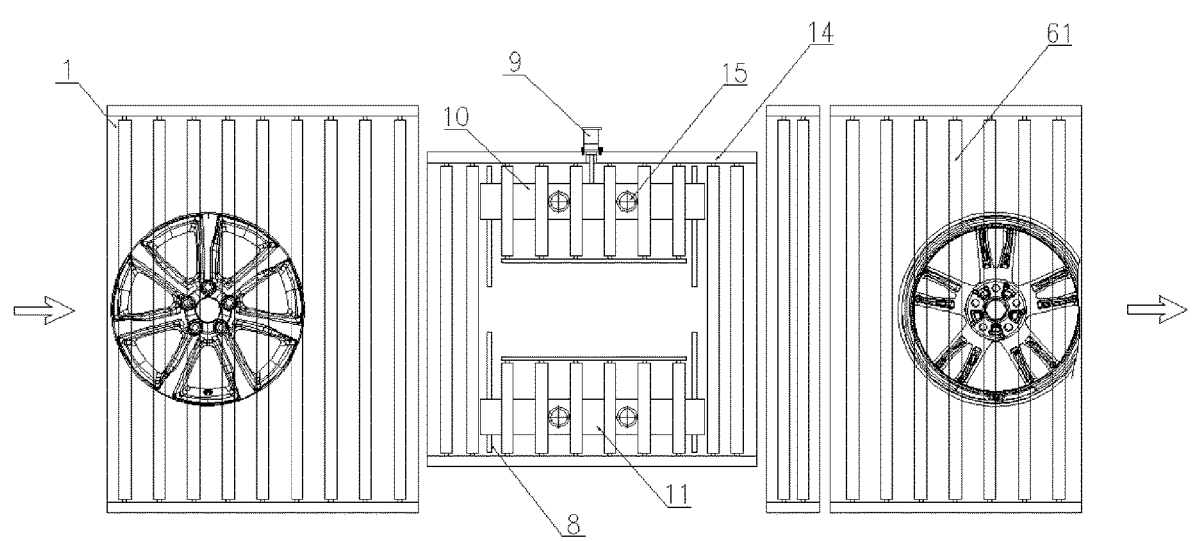
FIG. 2 is a top view.
Figure 3:
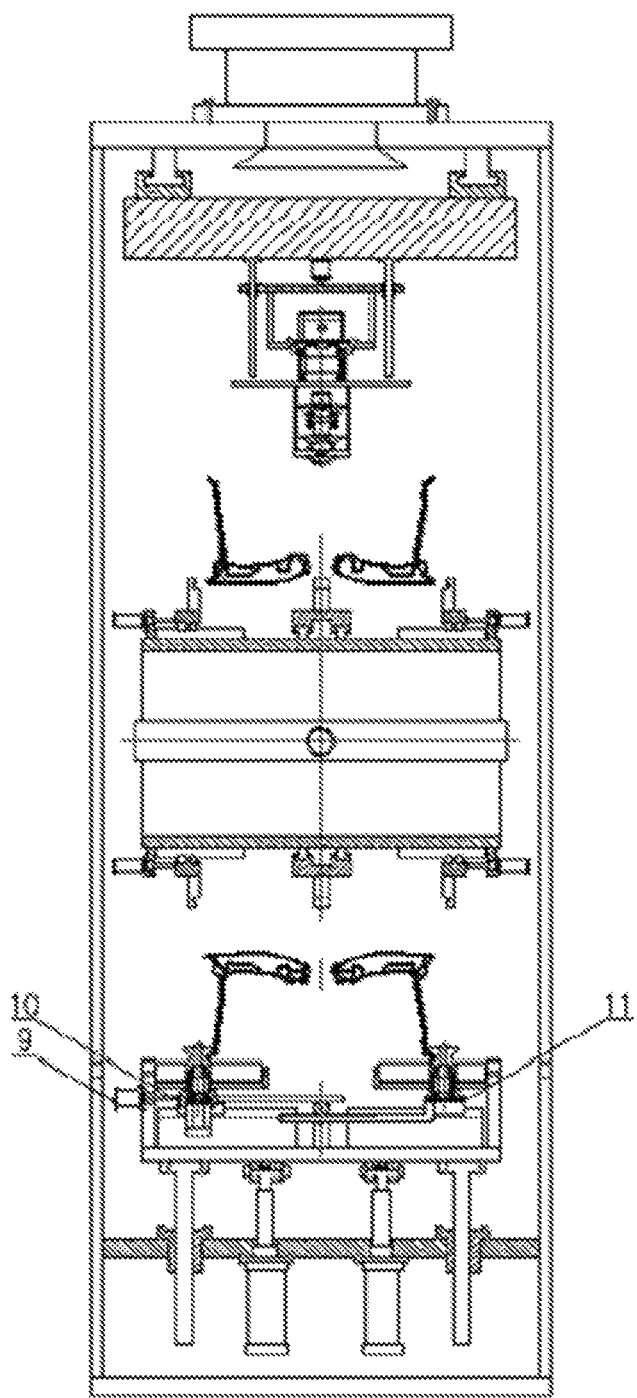
FIG. 3 is a left view.
Figure 4:
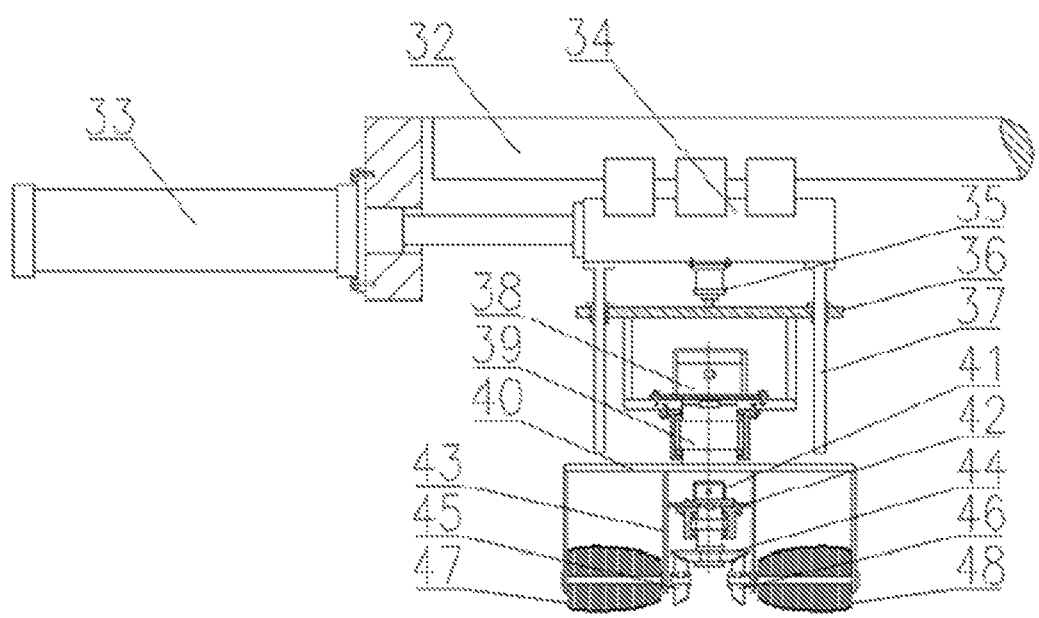
FIG. 4 is an enlarged view of a burr brushing system.
Figure 5:
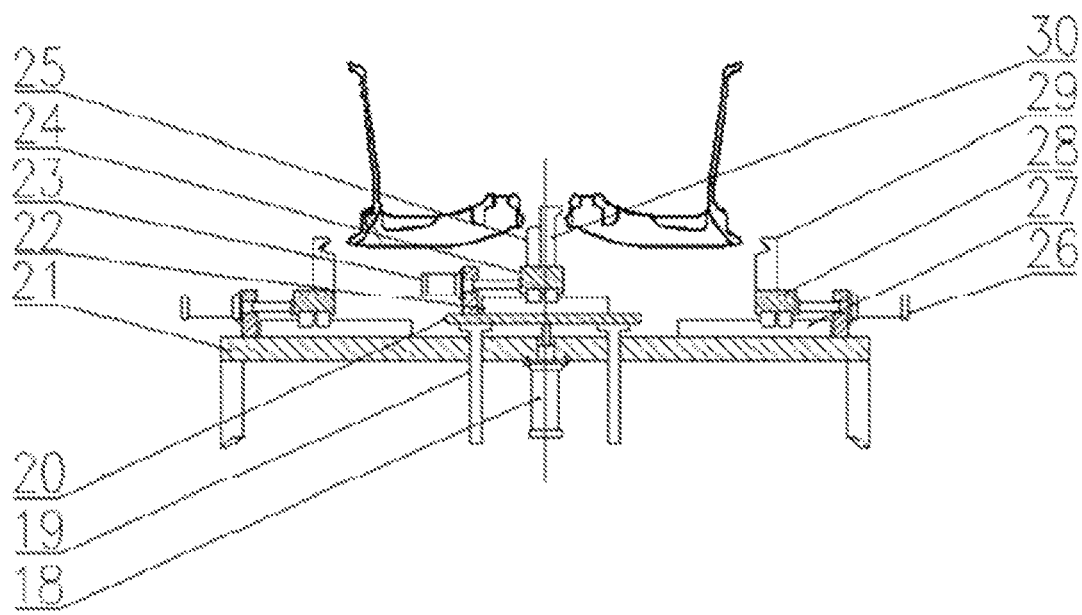
FIG. 5 is an enlarged view of front side deburring.
Figure 6:
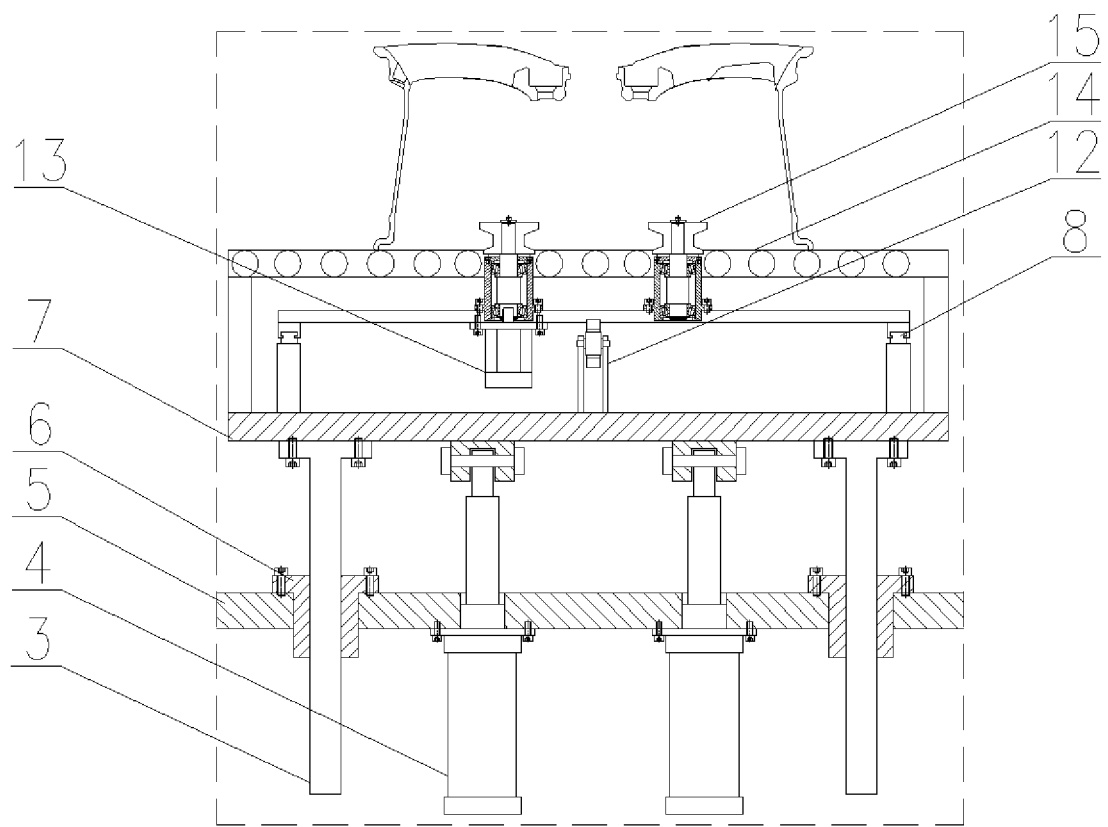
FIG. 6 is an enlarged view of area A in FIG. 1.

As illustrated in FIGS. 1-5, the machined wheel post-processing equipment comprises a wheel inlet roller way 1, a lower machine frame 2, lower guide posts 3, lower air cylinders 4, a supporting plate 5, guide sleeves 6, a lifting table 7, guide rails 8, a clamping cylinder 9, a left sliding plate 10, a right sliding plate 11, a rack and pinion 12, servomotors 13, a lifting roller way 14, clamping wheels 15, a first servomotor 16, an overturning platform 17, first air cylinders 18, first guide posts 19, first platforms 20, supporting tables 21, first guide rails 22, regulating cylinders 23, first sliders 24, riser deburr knives 25, second air cylinders 26, second guide rails 27, second sliders 28, wheel rim deburr knives 29, tool-connecting-edge deburr knives 30, an upper machine frame 31, cross guide rails 32, a left air cylinder 33, a left slider 34, an third air cylinder 35, a second platform 36, second guide posts 37, a second servomotor 38, a shaft 39, a rotating rack 40, a third servomotor 41, an inner support 42, roller shaft brackets 43, a driving bevel gear 44, a left driven bevel gear 45, a right driven bevel gear 46, a left hair brush 47, a right hair brush 48, an air compressor 49, an air outlet hood 50, a right air cylinder 51, a right slider 52, an fourth air cylinder 53, third guide posts 54, a third platform 55, a sleeve 56, an inner air cylinder 57, a draw bar 58, an expansion core 59, an expansion sleeve 60 and a wheel outlet roller way 61.

The machined wheel post-processing equipment is composed of five systems. A first system is a wheel front side deburring system which is used for completing the locating, clamping, lifting, rotating and front side deburring of the wheel; a second system is a wheel on-line orientation changing system which is used for changing the wheel into the state that the back cavity faces upwards from the state that the front side of the wheel faces upwards; a third system is a spoke back-cavity burr brushing system which is used for completing burr brushing of the back cavity of the wheel; a fourth system is a cleaning system, wherein a center hole and a back cavity of a hub are blown clean through compressed air, and thus, the accuracy of subsequent automatic detection is guaranteed; and a fifth system is a discharging system which is used for transferring the wheel downwards to the wheel outlet roller way from a worktable. Through close cooperation of the five systems, the beat is short, the efficiency is high, requirements for deburring and burr brushing processes after the wheel is machined can be met, the on-line orientation changing of the wheel can be achieved, and preparations are made for automatic detection on the wheel.

The lower air cylinders 4 are fixed onto the supporting plate 5, the output ends of the lower air cylinders 4 are connected with the lifting table 7, and the lower air cylinders 4 control the lifting table 7 to move up and down under the guiding action of the lower guide posts 3. The guide rails 8 are symmetrically mounted on the lifting table 7, the left sliding plate 10 and the right sliding plate 11 are mounted on the guide rails 8 and are connected by the rack and pinion 12, and the output end of the clamping cylinder 9 is connected with the left sliding plate 10. Four servomotors 13 are symmetrically mounted on the left sliding plate 10 and the right sliding plate 11, the clamping wheels 15 are mounted at the output ends of the motors, the lifting roller way 14 is fixed onto the lifting table 7, and the lifting roller way 14 and the wheel inlet roller way 1 are consistent in height. The wheel enters the lifting roller way 14 from the wheel inlet roller way 1, then, the clamping cylinder 9 is started up, the wheel can be located and clamped by the four clamping wheels 15 under the action of the rack and pinion 12, then, the servomotors 13 are started up to drive the clamping wheels 15 to rotate, the wheel can be driven to rotate at a low speed, then, the lower air cylinders 4 are started up to drive the lifting table 7 to rise, and thus, the rotating wheel is lifted to a proper height. The supporting tables 21 are arranged right above the rotating wheel, four second air cylinders 26 are uniformly distributed at circumferential direction of each supporting table 21, the output ends of the second air cylinders 26 are connected with four second sliders 28, horizontal movement of the second sliders 28 is controlled by the second air cylinders 26 under the guiding action of the second guide rails 27, and four wheel rim deburr knives 29 are uniformly distributed on the four second sliders 28. The first air cylinders 18 are mounted at centers of the supporting tables 21, the first platforms 20 are controlled to move up and down under the guiding action of the first guide posts 19, the regulating cylinders 23 are fixed onto the first platforms 20, the output ends of the regulating cylinders 23 are connected with the first sliders 24, horizontal movement of the first sliders 24 is controlled by the regulating cylinders 23 under the guiding action of the first guide rails 22, the riser deburr knives 25 and the tool-connecting-edge deburr knives 30 are mounted on the first sliders 24 in a back-to-back manner, vertical and horizontal positions of the riser deburr knives 25 and the tool-connecting-edge deburr knives 30 can be regulated by the first air cylinders 18 and the regulating cylinders 23, and thus, the deburr knives can be in contact with to-be-deburred parts. After the rotating wheel is lifted to the proper height, the four second air cylinders 26 are started up simultaneously to drive the four wheel rim deburr knives 29 to simultaneously gather towards the center of the wheel, and burrs of an outer rim can be removed when the wheel rim deburr knives 29 are in contact with the rotating wheel. During wheel rim deburring, positions of the riser deburr knives 25 are adjusted firstly by the first air cylinders 18 and the regulating cylinders 23, then, the knives can be in contact with the rotating wheel, and thus, riser burrs are removed; and then, positions of the tool-connecting-edge deburr knives 30 are adjusted, then, the knives can be in contact with the rotating wheel, and thus, tool-connecting-edge burrs are removed. This is the wheel front side deburring system which is used for completing the locating, clamping, lifting, rotating and front side deburring of the wheel.

The first servomotor 16 is fixed at the side of the lower machine frame 2, the output end of the first servomotor 16 is connected with the overturning platform 17, the supporting tables 21 are symmetrically distributed on the upper and lower surfaces of the overturning platform 17, and the deburr knives are arranged on the supporting tables 21. After the front side deburring of the wheel is completed, the riser deburr knives 25 and the tool-connecting-edge deburr knives 30 are retracted and restored to the original position, the four wheel rim deburr knives 29 are kept immobile, the outer rim of the wheel is clamped by using spoon-shaped structures, the clamping wheels 15 are loosened, the lifting table 7 falls back and is restored to the original position, and at this time, switching from the roller way to in-the-air clamping of the wheel is completed; and then, the first servomotor 16 is started up to drive the overturning platform 17 to turn over by 180 degrees, the wheel-loaded supporting table 21 is switched to an upward side, the wheel is changed into the state that the back cavity faces upwards from the state that the front side faces upwards, and the unloaded supporting table 21 is switched to a downward side and gets ready for front side deburring and clamping of a next wheel. This is the wheel on-line orientation changing system.

The two cross guide rails 32 are mounted on the upper machine frame 31, the left air cylinder 33 is mounted at the left side of the upper machine frame 31, the output end of the left air cylinder 33 is connected with the left slider 34, and the left slider 34 is mounted on the cross guide rails 32. The third air cylinder 35 is fixed at the lower part of the left slider 34, and up-and-down movement of the second platform 36 is controlled by the third air cylinder 35 under the guiding action of the second guide posts 37. The second servomotor 38 is fixed onto the second platform 36, the rotating rack 40 is mounted at the output end of the second servomotor 38, the roller shaft brackets 43 are symmetrically mounted at the left and right ends of the rotating rack 40, the inner support 42 is mounted in the middle of the rotating rack 40, the third servomotor 41 is mounted on the inner support 42, the output end of the third servomotor 41 is connected with the driving bevel gear 44, the left driven bevel gear 45 is mounted on a left-side roller shaft and is matched with the driving bevel gear 44, a right driven bevel gear 46 is mounted on a right-side roller shaft and is matched with the driving bevel gear 44, the left hair brush 47 is mounted on the left-side roller shaft, and the right hair brush 48 is mounted on the right-side roller shaft. When the front side deburred wheel is switched into the state that the back cavity faces upwards, the left air cylinder 33 is started up to drive the hair brushes to be located right above the back cavity of the wheel, then, the third air cylinder 35 is started up to drive the hair brushes to descend in place, then, the second servomotor 38 is started up to drive the rotating rack 40 to rotate, and thus, the hair brushes are driven to rotate in the circumferential direction; and at the same time, the third servomotor 41 is started up to drive the driving bevel gear 44 to rotate, thus, the left hair brush 47 and the right hair brush 48 are driven to rotate, and multi-orientation and multi-angle burr brushing can be achieved through circumferential rotation and rotation of the hair brushes. This is the spoke back-cavity burr brushing system which is used for completing burr brushing of the back cavity of the wheel.

The air compressor 49 is mounted at the dead center of the upper machine frame 31, and the air outlet hood 50 is mounted at the output end of the compressor and is located between the two cross guide rails 32. After burr brushing of the back cavity of the wheel is completed, the hair brushes are retracted and restored to the original position, then, the air compressor 49 is started up, compressed air is blown to the back cavity of the wheel through the air outlet hood 50, remaining and brushed-off aluminum chip burrs are cleaned up through the compressed air, and thus, this is the cleaning system; and the center hole and the back cavity of the hub are blown clean, and thus, the accuracy of subsequent automatic detection on center hole diameter, position degree, etc. is guaranteed.

The right air cylinder 51 is mounted at the right side of the upper machine frame 31, the output end of the right air cylinder 51 is connected with the right slider 52, the right slider 52 is mounted on the cross guide rails 32, the fourth air cylinder 53 is fixed at the lower part of the right slider 52, the fourth air cylinder 53 drives the third platform 55 to move up and down under the guiding action of the third guide posts 54, the sleeve 56 is fixed onto the third platform 55, the inner air cylinder 57 is mounted inside the sleeve 56, the draw bar 58 is mounted at the output end of the inner air cylinder 57 and is connected with the expansion core 59, and the expansion core 59 cooperates with the expansion sleeve 60. After the back cavity of the wheel is cleaned up, the right air cylinder 51 is started up to drive the expansion sleeve 60 to be located right above the wheel, then, the fourth air cylinder 53 is started up to drive the expansion sleeve 60 to descend into the center hole of the wheel, then, the inner air cylinder 57 is started up to draw the expansion core 59, and the wheel is expanded by the expansion sleeve 60. Then, the wheel is loosened by the wheel rim deburr knives 29, the fourth air cylinder 53 drives the third platform 55 to ascend, the wheel is lifted, then, the right air cylinder 51 is retracted and restored to the original position, the wheel is transferred to a position above the wheel outlet roller way 61, finally, the fourth air cylinder 53 drives the third platform 55 to descend, the expansion sleeve 60 is loosened, and the wheel is placed on the wheel outlet roller way 61 for downward transferring. This is the discharging system.

A working process of the machined wheel post-processing equipment is as follows: a wheel enters the lifting roller way 14 from the wheel inlet roller way 1, then, the clamping cylinder 9 is started up, the wheel can be located and clamped by the four clamping wheels 15 under the action of the rack and pinion 12, then, the servomotors 13 are started up to drive the clamping wheels 15 to rotate, the wheel can be driven to rotate at a low speed, then, the lower air cylinders 4 are started up to drive the lifting table 7 to rise, and thus, the rotating wheel is lifted to a proper height. The four second air cylinders 26 are started up simultaneously to drive the four wheel rim deburr knives 29 to simultaneously gather towards the center of the wheel, and burrs of an outer rim can be removed when the wheel rim deburr knives 29 are in contact with the rotating wheel. During wheel rim deburring, positions of the riser deburr knives 25 are adjusted firstly by the first air cylinders 18 and the regulating cylinders 23, then, the knives can be in contact with the rotating wheel, and thus, riser burrs are removed; and then, positions of the tool-connecting-edge deburr knives 30 are adjusted, then, the knives can be in contact with the rotating wheel, and thus, tool-connecting-edge burrs are removed. After the front side deburring of the wheel is completed, the riser deburr knives 25 and the tool-connecting-edge burr knives 30 are retreated and restored to the original position, the four wheel rim deburr knives 29 are kept immobile, the outer rim of the wheel is clamped by using spoon-shaped structures, the clamping wheels 15 are loosened, the lifting table 7 falls back and is restored to the original position, and then, switching from the roller way to in-the-air clamping of the wheel is completed; and then, the first servomotor 16 is started up to drive the overturning platform 17 to turn over by 180 degrees, the wheel-loaded supporting table 21 is switched to an upward side, the wheel is changed into the state that the back cavity faces upwards from the state that the front side faces upwards, and the unloaded supporting table 21 is switched to a downward side and gets ready for front side deburring and clamping of a next wheel. When the front side deburred wheel is switched into the state that back cavity faces upwards, the left air cylinder 33 is started up to drive the hair brushes to be located right above the back cavity of the wheel, then, the third air cylinder 35 is started up to drive the hair brushes to descend in place, then, the second servomotor 38 is started up to drive the rotating rack 40 to rotate, and thus, the hair brushes are driven to rotate in the circumferential direction; and at the same time, the third servomotor 41 is started up to drive the driving bevel gear 44 to rotate, thus, the left hair brush 47 and the right hair brush 48 are driven to rotate, and multi-orientation and multi-angle burr brushing can be achieved through circumferential rotation and rotation of the hair brushes. After burr brushing of the back cavity of the wheel is completed, the hair brushes are retreated and restored to the original position, then, the air compressor 49 is started up, compressed air is blown to the back cavity of the wheel through the air outlet hood 50, remaining and brushed-off aluminum chip burrs are cleaned up through the compressed air, after the back cavity of the wheel is cleaned up, the right air cylinder 51 is started up to drive the expansion sleeve 60 to be located right above the wheel, then, the fourth air cylinder 53 is started up to drive the expansion sleeve 60 to descend into the center hole of the wheel, then, the inner air cylinder 57 is started up to draw the expansion core 59, and the wheel is expanded by the expansion sleeve 60. Then, the wheel is loosened by the wheel rim deburr knives 29, the fourth air cylinder 53 drives the third platform 55 to ascend, the wheel is lifted, then, the right air cylinder 51 is retreated and restored to the original position, the wheel is transferred to a position above the wheel outlet roller way 61, finally, the fourth air cylinder 53 drives the third platform 55 to descend, the expansion sleeve 60 is loosened, and the wheel is placed on the wheel outlet roller way 61 for downwards transferring. A second wheel is subjected to feeding, clamping and front side deburring while the first wheel is subjected to burr brushing, back cavity cleaning and downwards transferring; and after the burr-brushed wheel is downwards transferred, upper and lower stations are switched, and this cycle is repeated. Beats are integrated and compressed, and the upper and lower stations perform actions simultaneously, so that the working efficiency is increased greatly.

According to the machined wheel post-processing equipment, requirements for deburring and burr brushing after the wheel is machined can be met, the efficiency of post-processing processes can be increased greatly, the on-line orientation changing of the wheel is achieved, and preparations are made for automatic detection on the wheel.

The invention claimed is:

1. A machined wheel post-processing equipment, comprising a wheel inlet roller way, a lower machine frame, lower guide posts, lower air cylinders, a supporting plate, guide sleeves, a lifting table, first guide rails, a clamping cylinder, a left sliding plate, a right sliding plate, a rack and pinion, first servomotors, a lifting roller way, clamping wheels, second servomotor, an overturning platform, first air cylinders, first guide posts, first platforms, supporting tables, second guide rails, regulating cylinders, first sliders, riser deburr knives, second air cylinders, third guide rails, second sliders, wheel rim deburr knives, tool-connecting-edge deburr knives, an upper machine frame, cross guide rails, a left air cylinder, a left slider, a third air cylinder, a second platform, second guide posts, a third servomotor, a shaft, a rotating rack, a fourth servomotor, an inner support, roller shaft brackets, a driving bevel gear, a left driven bevel gear, a right driven bevel gear, a left hair brush, a right hair brush, an air compressor, an air outlet hood, a right air cylinder, a right slider, a fourth air cylinder, third guide posts, a third platform, a sleeve, an inner air cylinder, a draw bar, an expansion core, an expansion sleeve and a wheel outlet roller way, wherein, the supporting tables are configured to be arranged right above a machined wheel, four second air cylinders are uniformly distributed at circumferential direction of each supporting table, output ends of the four second air cylinders are connected with four second sliders, horizontal movement of the four second sliders is controlled by the four second air cylinders under a guiding action of the third guide rails, four-wheel rim deburr knives are uniformly distributed on the four second sliders, the first air cylinders are mounted at centers of the supporting tables, the first platforms are controlled to move up and down under the guiding action of the first guide posts, the regulating cylinders are fixed onto the first platforms, output ends of the regulating cylinders are connected with the first sliders, horizontal movement of the first sliders is controlled by the regulating cylinders under the guiding action of the second guide rails, the riser deburr knives and the tool-connecting-edge deburr knives are mounted on the first sliders in a back-to-back manner, vertical and horizontal positions of the riser deburr knives and the tool-connecting-edge deburr knives can be regulated by the first air cylinders and the regulating cylinders, so that the deburr knives can be in contact with parts to be deburred.

* * * * *